(12) United States Patent
Furrer et al.

(10) Patent No.: US 8,145,161 B2
(45) Date of Patent: Mar. 27, 2012

(54) RECEIVE CONFIGURATION ADAPTATION FOR WIRELESS TRANSCEIVERS

(75) Inventors: Simeon Furrer, Mountain View, CA (US); Joachim S. Hammerschmidt, Mountain View, CA (US); Arash Behzad, Poway, CA (US); George Kondylis, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 1002 days.

(21) Appl. No.: 12/111,203

(22) Filed: Apr. 29, 2008

(65) Prior Publication Data

US 2009/0117858 A1    May 7, 2009

Related U.S. Application Data

(60) Provisional application No. 60/984,788, filed on Nov. 2, 2007.

(51) Int. Cl.
*H04B 17/02* (2006.01)

(52) U.S. Cl. .................. 455/136; 455/132; 455/133

(58) Field of Classification Search .......... 455/132–136, 455/230–234, 269, 272, 275, 277.1, 273, 455/277.2, 278.1; 370/445, 447, 462
See application file for complete search history.

(56) References Cited

U.S. PATENT DOCUMENTS 7,047,046 B2 * 5/2006 Hoffmann et al. .......... 455/562.1
2006/0234646 A1 * 10/2006 Naguib et al. ................. 455/69

* cited by examiner

*Primary Examiner* — Christian Hannon
(74) *Attorney, Agent, or Firm* — Garlick & Markison; Bruce E. Garlick (57) ABSTRACT

An integrated circuit radio transceiver and method therefor is operable to determine an antenna configuration for receive operations. More specifically, the system is operable to determine a receive antenna configuration in a network that includes a number of spatial streams, antenna configuration information, code rate, quadrature modulation type, and transmission protocol modulation scheme, etc. Generally, a selected antenna configuration for transmissions to a remote transceiver is used as an initial antenna configuration for receive operations.

24 Claims, 9 Drawing Sheets

FIG. 1
network 10

FIG. 2

FIG. 4
wireless transmitter processor 150

FIG. 5
MIMO transceiver 170

FIG. 6 antenna configuration for Rx operations Table 200

| remote transceiver source address | Rx antenna configuration |
|---|---|
| nnnnnn1 | antenna configuration A |
| nnnnnn2 | antenna configuration B |
| nnnnnn3 | antenna configuration C |
| nnnnnn4 | antenna configuration D |
| nnnnnn5 | antenna configuration E |
| nnnnnn6 | antenna configuration F |
| nnnnnn7 | antenna configuration G |

FIG. 8
signal sequence for communication system 250

FIG. 9 integrated circuit transceiver 300

RECEIVE CONFIGURATION ADAPTATION FOR WIRELESS TRANSCEIVERS

CROSS REFERENCE TO RELATED PATENTS

The present U.S. Utility Patent Application claims priority pursuant to 35 U.S.C. §119(e) to U.S. Provisional Application Ser. No. 60/984,788, entitled "Receive Configuration Adaptation for Wireless Transceivers", filed Nov. 2, 2007, which is hereby incorporated herein by reference in its entirety and made part of the present U.S. Utility Patent Application for all purposes.

BACKGROUND

1. Technical Field

The present invention relates to wireless communications and, more particularly, to circuitry and logic for generating outgoing communication signals.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

Typically, the data modulation stage is implemented on a baseband processor chip, while the intermediate frequency (IF) stages and power amplifier stage are implemented on a separate radio processor chip. Historically, radio integrated circuits have been designed using bi-polar circuitry, allowing for large signal swings and linear transmitter component behavior. Therefore, many legacy baseband processors employ analog interfaces that communicate analog signals to and from the radio processor.

In traditional transmission protocols, a plurality of transmit schemes may be defined that correspond to different transmission rates. A number of data rates for wireless orthogonal frequency division multiplex (OFDM) may be utilized based upon channel conditions. One problem, however, is that data robustness often decreases with increased data rates. Accordingly, a trade off exists between data rates and robustness. A need exists, therefore, for a transceiver that is operable to modify transmit and receive configurations and schemes for communications with a remote transceiver.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
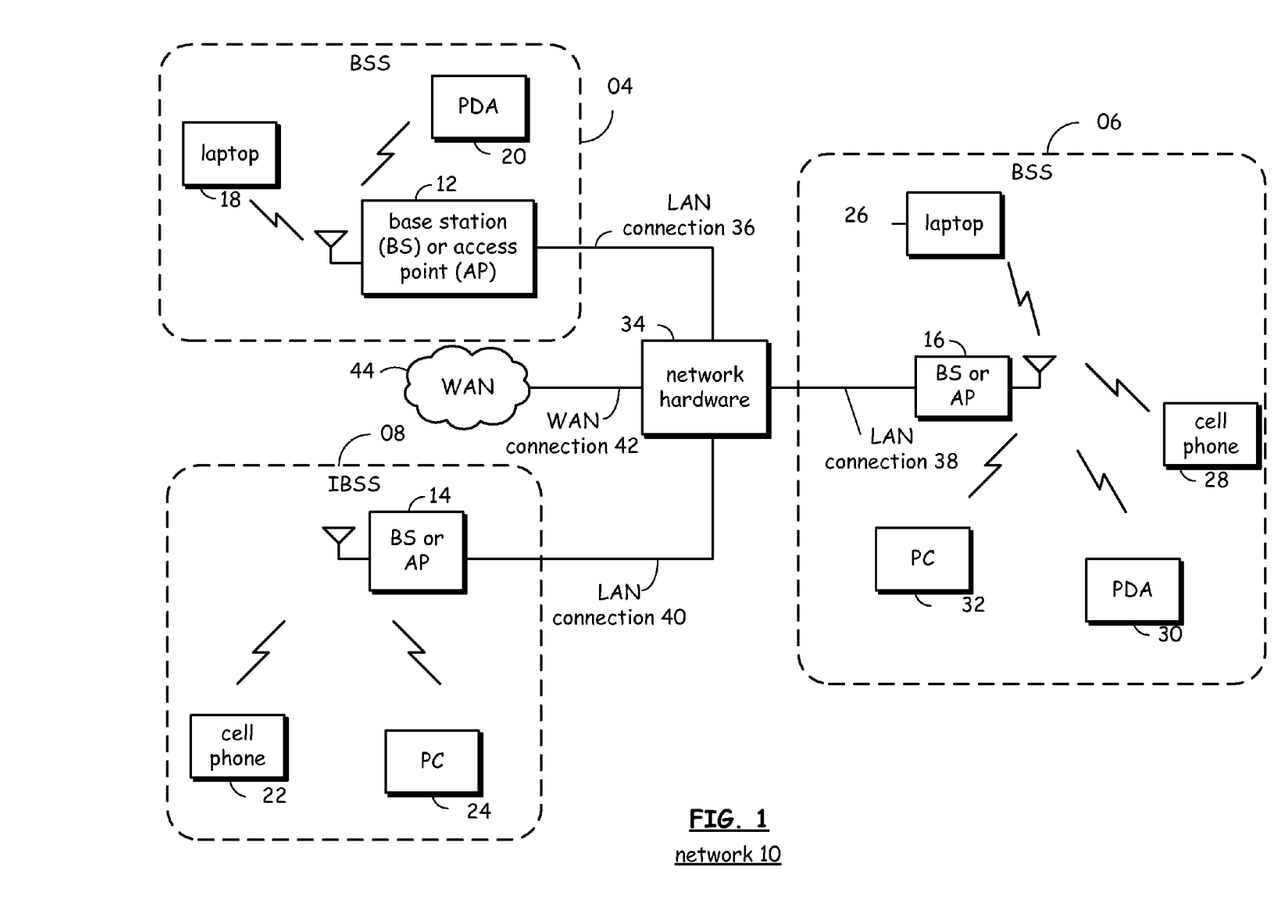
FIG. 1 is a functional block diagram illustrating a communication system that includes circuit devices and network elements and operation thereof according to one embodiment of the invention.

FIG. 1 is a functional block diagram illustrating a communication system that includes circuit devices and network elements and operation thereof according to one embodiment of the invention. More specifically, a plurality of network service areas 04, 06 and 08 are a part of a network 10. Network 10 includes a plurality of base stations or access points (APs) 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to Figures that follow.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network (WAN) connection 42 for the communication system 10 to an external network element such as WAN 44. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. Generally, though, each transceiver is operable to adopt transmission schemes for outgoing signals and antenna configurations for ingoing signals according to the various embodiments of the invention based on channel conditions.

Figure 2:
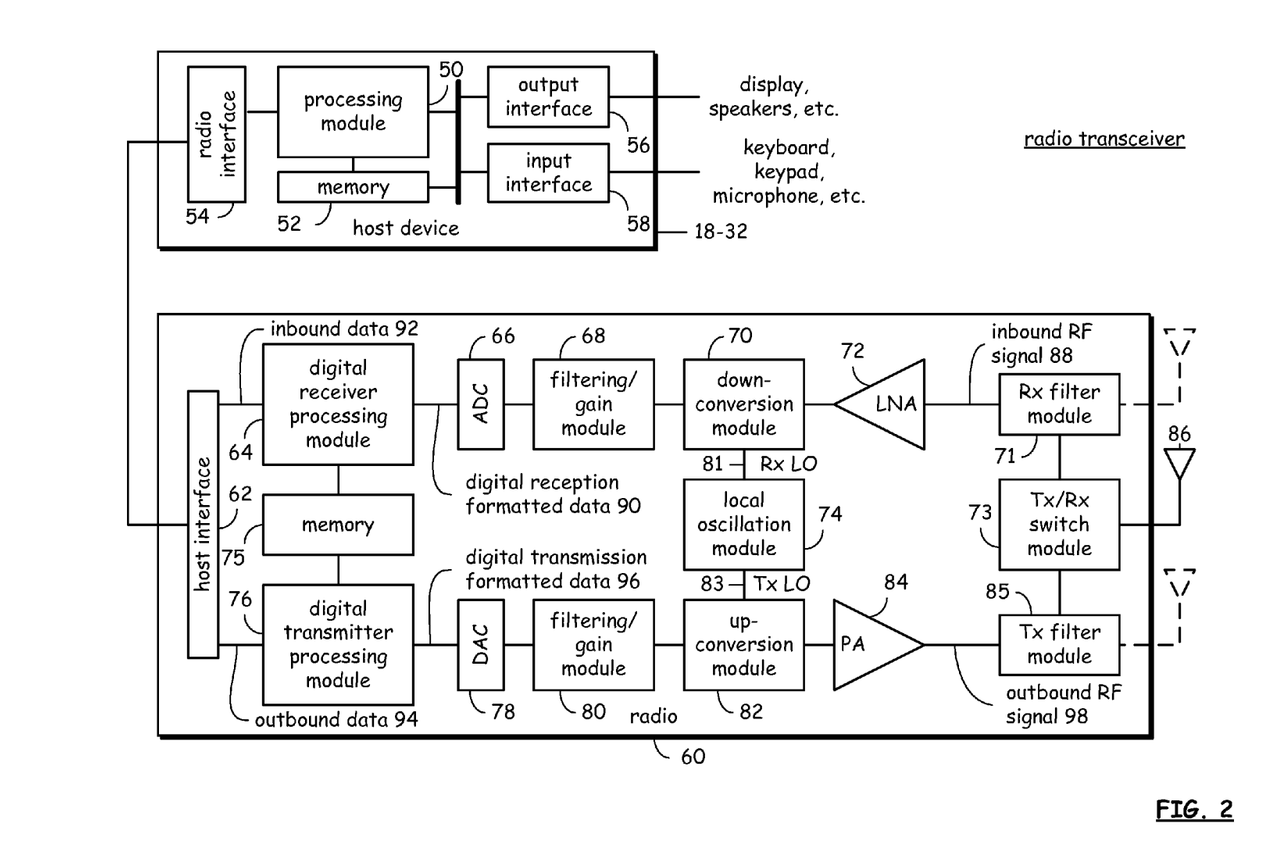
FIG. 2 is a schematic block diagram illustrating a wireless communication host device and an associated radio.

FIG. 2 is a schematic block diagram illustrating a wireless communication host device 18-32 and an associated radio 60. For cellular telephone hosts, radio 60 is a built-in component. For personal digital assistants hosts, laptop hosts, and/or personal computer hosts, the radio 60 may be built-in or an externally coupled component.

As illustrated, wireless communication host device 18-32 includes a processing module 50, a memory 52, a radio interface 54, an input interface 58 and an output interface 56. Processing module 50 and memory 52 execute the corresponding instructions that are typically done by the host device. For example, for a cellular telephone host device, processing module 50 performs the corresponding communication functions in accordance with a particular cellular telephone standard.

Radio interface 54 allows data to be received from and sent to radio 60. For data received from radio 60 (e.g., inbound data), radio interface 54 provides the data to processing module 50 for further processing and/or routing to output interface 56. Output interface 56 provides connectivity to an output device such as a display, monitor, speakers, etc., such that the received data may be displayed. Radio interface 54 also provides data from processing module 50 to radio 60. Processing module 50 may receive the outbound data from an input device such as a keyboard, keypad, microphone, etc., via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (Tx/Rx) switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 is shared by transmit and receive paths as regulated by the Tx/Rx switch module 73. The antenna implementation will depend on the particular standard to which the wireless communication device is compliant.

Digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and modulation. Digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes, operational instructions corresponding to at least some of the functions illustrated herein.

In operation, radio 60 receives outbound data 94 from wireless communication host device 18-32 via host interface 62. Host interface 62 routes outbound data 94 to digital transmitter processing module 76, which processes outbound data 94 in accordance with a particular wireless communication standard or protocol (e.g., IEEE 802.11(a), IEEE 802.9, Bluetooth, etc.) to produce digital transmission formatted data 96. Digital transmission formatted data 96 will be a digital baseband signal or a digital low IF signal, where the low IF typically will be in the frequency range of one hundred kilohertz to a few megahertz.

Digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation 83 provided by local oscillation module 74. Power amplifier 84 amplifies the RF signal to produce an outbound RF signal 98, which is filtered by transmitter filter module 85. The antenna 86 transmits outbound RF signal 98 to a targeted device such as a base station, an access point and/or another wireless communication device.

Radio 60 also receives an inbound RF signal 88 via antenna 86, which was transmitted by a base station, an access point, or another wireless communication device. The antenna 86 provides inbound RF signal 88 to receiver filter module 71 via Tx/Rx switch module 73, where Rx filter module 71 band pass filters inbound RF signal 88. The Rx filter module 71 provides the filtered RF signal to low noise amplifier 72, which amplifies inbound RF signal 88 to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation 81 provided by local oscillation module 74. Down-conversion module 70 provides the inbound low IF signal or baseband signal to filtering/gain module 68. Filtering/gain module 68 may be implemented in accordance with the teachings of the present invention to filter and/or attenuate the inbound low IF signal or the inbound baseband signal to produce a filtered inbound signal.

Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to the wireless communication host device 18-32 via radio interface 54.

As one of average skill in the art will appreciate, the wireless communication device of FIG. 2 may be implemented using one or more integrated circuits. For example, the host device may be implemented on a first integrated circuit, while digital receiver processing module 64, digital transmitter processing module 76 and memory 75 may be implemented on a second integrated circuit, and the remaining components of radio 60, less antenna 86, may be implemented on a third integrated circuit. As an alternate example, radio 60 may be implemented on a single integrated circuit. As yet another example, processing module 50 of the host device and digital receiver processing module 64 and digital transmitter processing module 76 may be a common processing device implemented on a single integrated circuit.

Memory 52 and memory 75 may be implemented on a single integrated circuit and/or on the same integrated circuit as the common processing modules of processing module 50, digital receiver processing module 64, and digital transmitter processing module 76. As will be described, it is important that accurate oscillation signals are provided to mixers and conversion modules. A source of oscillation error is noise coupled into oscillation circuitry through integrated circuitry biasing circuitry. One embodiment of the present invention reduces the noise by providing a selectable pole low pass filter in current mirror devices formed within the one or more integrated circuits.

Local oscillation module 74 includes circuitry for adjusting an output frequency of a local oscillation signal. Local oscillation module 74 receives a frequency correction input that it uses to adjust an output local oscillation signal to produce a frequency corrected local oscillation signal output. While local oscillation module 74, up-conversion module 82 and down-conversion module 70 are implemented to perform direct conversion between baseband and RF, it is understood that the principles herein may also be applied readily to systems that implement an intermediate frequency conversion step at a low intermediate frequency.

Figure 3:
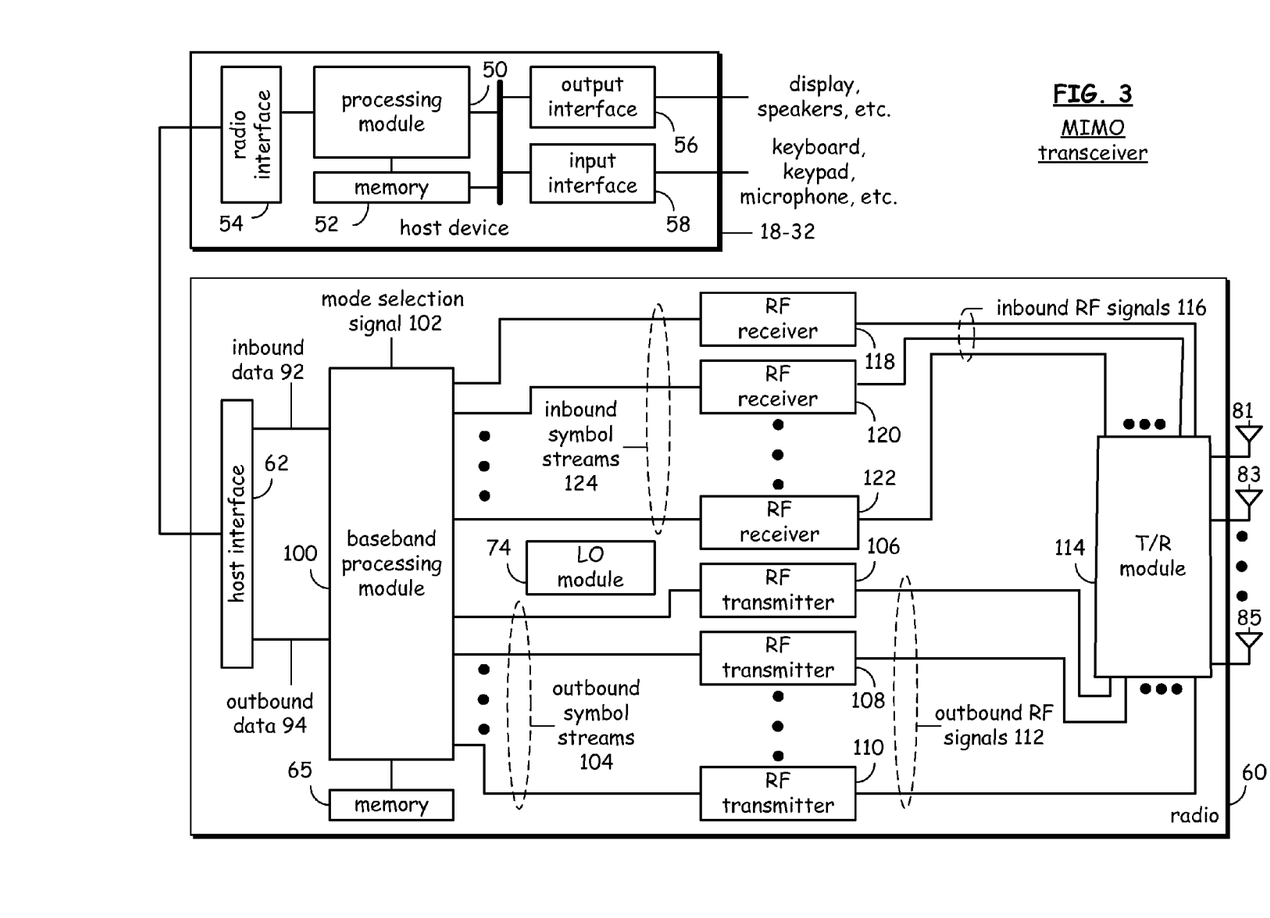
FIG. 3 is a schematic block diagram illustrating a wireless communication device that includes the host device and an associated radio.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing module 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 100 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode selection signal 102 may also include a code rate, a number of coded bits per sub-carrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode selection signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode selection signal 102 indicates 2, 3 or 4 antennas, the baseband processing module 100 will produce 2, 3 or 4 outbound symbol streams 104 from the outbound data 94.

Depending on the number of outbound symbol streams 104 produced by the baseband processing module 100, a corresponding number of the RF transmitters 106-110 will be enabled to convert the outbound symbol streams 104 into outbound RF signals 112. In general, each of the RF transmitters 106-110 includes a digital filter and upsampling module, a digital-to-analog conversion module, an analog filter module, a frequency up conversion module, a power amplifier, and a radio frequency band-pass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on a first integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Changing transmit schemes for transmit operations and changing antenna configurations for receive operations according to the various embodiments of the invention are performed, within the embodiments of FIGS. 2 and 3, by the transmitter and receiver processing modules 76 and 64, respectively, of FIG. 2 and by the baseband processing module 100 of FIG. 3. Such dynamic configuration setting for transmit and receive operations are described in greater detail in the figures that follow.

Figure 4:
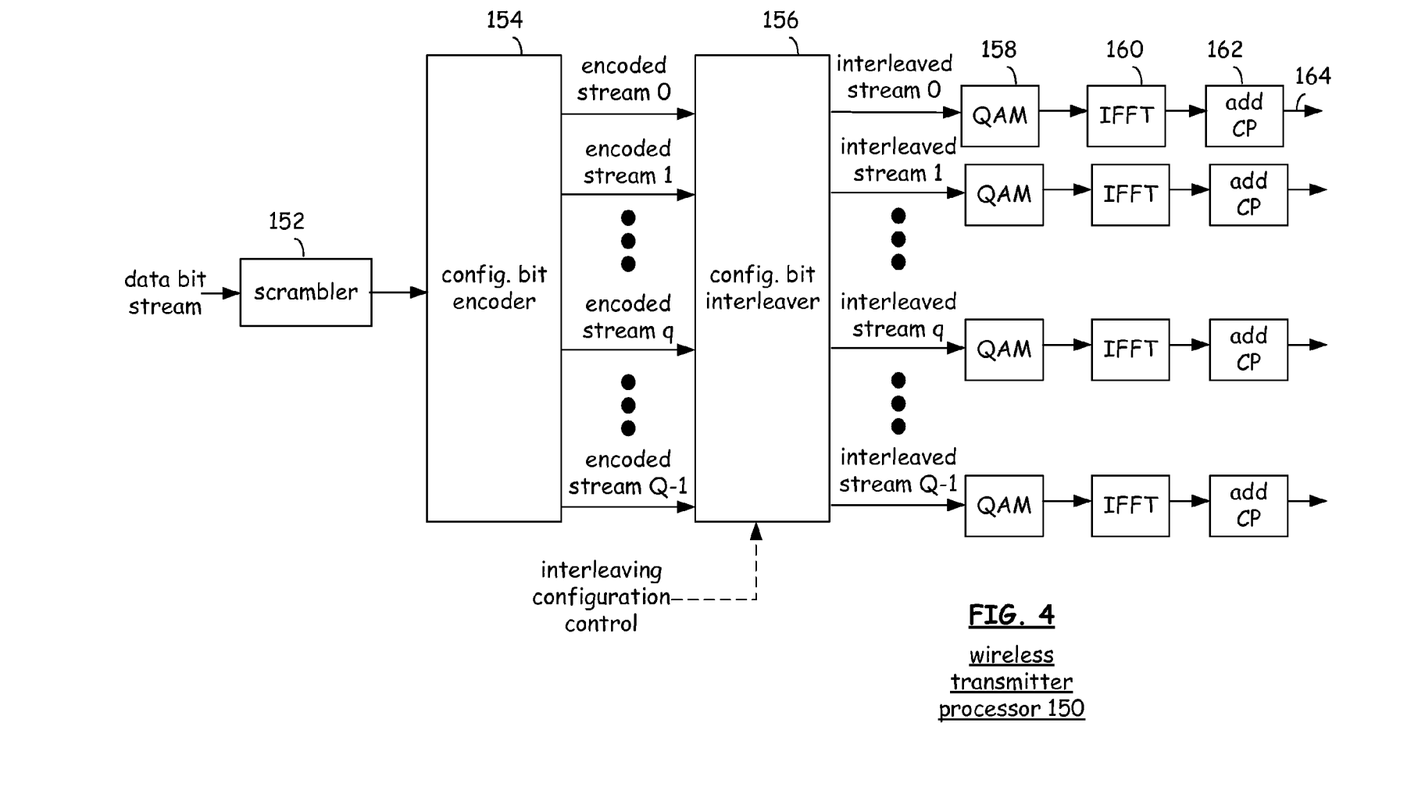
FIG. 4 is a functional block diagram of a wireless orthogonal frequency division multiplex (OFDM) transmitter processor that includes a multi-channel bit interleaver and other digital processing modules according to one embodiment of the invention.

FIG. 4 is a functional block diagram of a wireless orthogonal frequency division multiplex (OFDM) transmitter processor 150 that includes a multi-channel bit interleaver and other digital processing modules according to one embodiment of the invention. Generally, FIG. 4 illustrates one structure that supports MIMO transmission and thus illustrates the types of data and signal formats that a receiver must operably be able to configure itself to receive and process. Referring now to processor 150 of FIG. 4, a data bit stream is produced to a scrambler 152 where the bits are scrambled according to a specified technique. Scrambler 152 then produces scrambled bits to a configurable bit encoder 154 that encodes the scrambled bits and produces a specified number of encoded data streams. As is known by one of average skill in the art, encoders provide protection for bits to allow a bit stream portion to be reconstructed by a receiver if interference destroyed some of the bits in the transmission path. Here, encoder 154 produces encoded bits streams 0, 1, . . . q, . . . Q−1. Generally, the number of encoded bit streams is a function of the transmitter and a transmission mode of operation (transmission scheme). For example, the number encoded bit streams for an OFDM transmitter is the same as the number of OFDM sub-carriers used to simultaneously or nearly simultaneously transmit data by the OFDM transmitter.

Accordingly, encoder 154 produces Q−1 encoded streams for the Q−1 sub-carriers being used by the OFDM transmitter to interleaver 156. Interleaver 156 produces an equivalent number (Q−1) interleaved bit streams. The Q−1 interleaved bit streams produced by interleaver 156 are interleaved according to the various embodiments of the invention as described herein.

Thus, each of the Q−1 interleaved bit streams produced by interleaver 156 is processed through traditional processor logic blocks in preparation for transmission from a radio front end (not shown in FIG. 4). For example, interleaved bit stream 0 is produced constellation encoding block 158 which performs specified quadrature amplitude modulation. Any known type of quadrature amplitude modulation may be used. In one embodiment, a traditional QPSK modulation is used. In another embodiment, 16-QAM modulation is used. Other types include, but are not limited to binary phase quadrature modulation (BPSK), 8-PSK, 64-QAM, 128-QAM, and 256-QAM. Constellation encoding is generally performed to increase data rates by generating data symbols that represent one of a plurality of data states.

Encoding block 158 then produces a modulation encoded signal to inverse Fast Fourier Transform (IFFT) block 160 which is operable to produce an inverse Fast Fourier Transform (IFFT) of the modulation encoded signal 160 to cyclic prefix block 162 which is operable to produce a guard interval for the signal prior to transmission from a radio front end.

The output of the signal with the cyclic prefix is shown at 164. The output at 164 is then produced to the radio front end that filters, amplifies and up converts the outgoing signal to radio frequency prior to radiation from an antenna. Operation of each of the remaining branches for processing and transmitting the remaining Q-1 bit streams is the same as described for interleaved bit stream 0.

One aspect of the embodiment of the invention illustrated in FIG. 4 is that interleaver 156 is configurable to perform interleaving across the plurality of bit streams according the number of bit streams being generated for a multi-branch transmitter that is operable to transmit from a plurality of antennas using OFDM modulation. For example, merely because an OFDM transmitter has the circuitry to generate, for example, four OFDM outgoing signals, does not mean that the OFDM transmitter will always transmit over four streams at once. If, for example, a selected transmission mode requires transmission over only two channels, then "Q-1" (as shown in FIG. 4) is equal to two. Accordingly, configurable bit interleaver 156 receives only two encoded bit streams from encoder 154 and produces only two interleaved bits streams. Significantly, however, bits of each of the two bit streams are interleaved between the two streams in addition to being interleaved amongst the bits of each individual stream. Thus, interleaver 156 is configurable to utilize and includes logic configure the interleaving over a specified number of bit streams according to an interleaving configuration control signal.

Generally, the number of encoded streams received is not necessarily equal to the number of interleaved streams that are produced by configurable bit interleaver 156 (even though they are shown to be the same in FIG. 4). Further, the number of input and/or output streams may readily be modified based upon modes of transmission. FIG. 4 thus illustrates digital processing blocks that are modifiable according to transmission mode, rate, etc., according to a specified transmission scheme. For example, the number of streams, the type of modulation, and the bit rate may all be modified in the configuration of FIG. 4 according to a desired transmission scheme. These modifiable parameters thus affect what antenna configuration is used for transmit for transmissions to a specified remote transceiver and, therefore, what antenna configuration should be used for receive operations from the remote transceiver. Wireless transmit processor 150 is operable, generally, to determine how many antennas and which of a plurality of antennas best support the communication link between the wireless transceiver and the remote transceiver based upon at least one of a number of spatial streams; known remote transceiver antenna configuration information, an expected code rate, an expected quadrature modulation type, and a transmission protocol modulation scheme of the remote transceiver.

Assuming that a remote transceiver has structure that is configurable as is wireless transmitter processor 150 of FIG. 4, a transceiver may be required to change a previously determined antenna configuration for receive operations to one that improves signal reception. Accordingly, one aspect of the embodiments of the present invention include using test configurations to perform "Rx probing" to determine if a different "test configuration" provides better signal reception than a configuration being presently used.

Additionally, assuming reciprocity of a physical channel for received data transmissions from the remote transceiver in relation to transmissions to the remote transceiver, a receiver may change its receive antenna configuration for communications from the remote transceiver based upon a new antenna configuration determined for transmit operations. FIG. 4 thus illustrates that receive antenna configurations may change dynamically to match a new transmit antenna configuration based upon changing channel conditions. Because the transmit antenna configuration may change, the wireless transceiver is operable to update its stored receive configurations in a corresponding manner as will be described in greater detail in relation to FIGS. 5-9.

A wireless transceiver or receiver, according to one embodiment of the invention, may therefore change its antenna configuration for receive operations to use an antenna configuration that is more effective. A wireless transceiver is thus operable to change a number of antennas that are used to receive data packets. A wireless transceiver is also operable to keep a number of antennas in the determined antenna configuration constant but to modify the selected antennas to determine if received signal quality can be improved.

Figure 5:
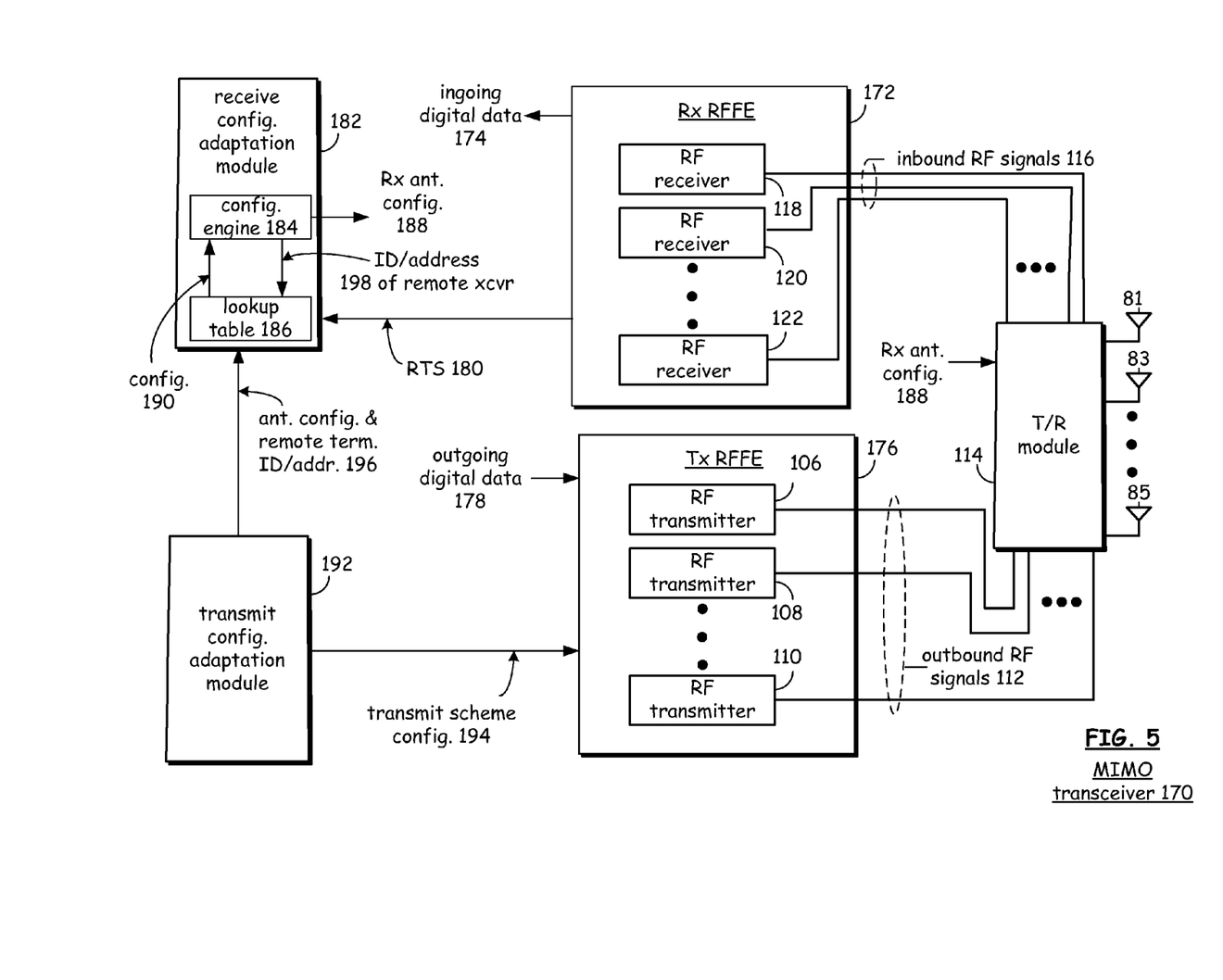
FIG. 5 is a functional block diagram of a wireless transceiver with transmitter and receiver modules according to one embodiment of the invention.

FIG. 5 is a functional block diagram of a wireless transceiver with transmitter and receiver modules according to one embodiment of the invention operable to support configurable transmit and receive antenna configurations. A MIMO transceiver 170 includes an Rx radio frequency front end (Rx RFFE) 172 operably disposed to receive inbound RF signals 116 from T/R receive module 114 to produce ingoing digital data 174. A Tx RFFE 176 is operably disposed to receive outgoing digital data 178 to produce outbound RF signals 112 to T/R module 114.

Rx RFFE 172 is also operable to produce a received RTS message 180 to a receive configuration adaptation module 182 which includes a configuration engine 184 and a lookup table 186. Configuration engine 184 is operable to produce Rx antenna configuration signal 188 to T/R module 114 based on a configuration 190 specified by lookup table 186 in which each of a plurality of antenna configurations is mapped to an identification (ID) of a remote transceiver. For example, the ID can comprise a source address of RTS message 180, a device ID, a communication link or channel ID or the equivalent. In one specific embodiment, each antenna configuration stored in lookup table 186 is mapped to a source address of a remote transceiver.

A transmit configuration adaptation module 192 is operable to produce a transmit scheme configuration signal 194 to Tx RFFE 176 for transmit operations to specify physical transmission parameters for outgoing RF signals. Transmit configuration adaptation module 192 is operable to determine an antenna configuration and other physical layer transmission parameters that relate to data rate for a given communication channel. Such parameters include, for example, code rate, quadrature amplitude modulation type (e.g., 16-QAM vs. QPSK), a number of data streams, and an underlying modulation scheme such as Direct Sequence Spread Spectrum (DSSS), Code-Division Multiple-Access (CDMA) or Orthogonal Frequency-Division Multiplexing (OFDM). Generally, a tradeoff exists between robustness with regard to the wireless propagation channel and data rate. According to current channel conditions and other considerations such as various types of interference, a best data rate may be achieved, however, by utilizing a lower data rate with great robustness. Accordingly, transmit configuration adaptation module 192 is operable to determine and set the physical layer transmission parameters, which includes the antenna configuration, that is appropriate for a transmission to a specified remote transceiver.

Additionally, transmit configuration adaptation module 192 is operable to produce an antenna configuration and remote transceiver ID/address 196 to receive configuration adaptation module 182. In one embodiment, configuration engine 184 is operable to produce an ID or address 198 of a remote transceiver that is about to send at least one data packet to MIMO transceiver 170 to lookup table 186 as an input to table 186. By assuming channel reciprocity, therefore, a transceiver is operable to store the antenna configurations for transmit operations for subsequent use for receive operations for communications with the same remote transceiver as identified by the selected type of ID (such as source address).

In operation, receive configuration adaptation module 174 is operable to store antenna configuration parameters (selected by the transmit configuration adaptation module 192) in relation to an ID or source address for communications with each of a plurality of remote transceivers in lookup table 182. The data in lookup table 182 is populated by and based upon the transmit antenna configuration and remote terminal ID/address message(s) 196 that was received from transmit configuration adaptation module 192. Accordingly, after an antenna configuration is stored in lookup table 186 in relation to an ID (e.g., source address of a remote transceiver) table 182 may be used to determine antenna configurations for subsequent receive operations. Generally, an antenna configuration for transmit operations will be used for receive operations for communications with a specified remote transceiver. In at least one embodiment, table 186 is populated with default antenna configurations which are subsequently updated as better antenna configuration information is received, for example, from transmit configuration adaptation module 192 in message (or signal) 196.

Accordingly, when receive configuration adaptation module 182 receives an RTS 180 (or other signal that can be used to identify a remote transceiver that is about to send at least one data packet), configuration engine 184 produces an ID/address 198 to lookup table 186 as an input to the lookup table to determine an antenna configuration 190 for the receive operations for the at least one data packet that is to be received from the remote transceiver (that corresponds to RTS 180). Configuration engine 184 then produces Rx antenna configuration signals 188 to T/R module 114 based on the configuration 190 received from lookup table 182 to establish an antenna configuration for at least one data packet that is being (or to be) received. This antenna configuration is maintained through receipt of at least one data packet and, in one embodiment, through a subsequent transmission of a acknowledge (ACK) to the remote transceiver. Rx antenna configuration signal 188 may be produced directly to T/R module 114 as shown here in FIG. 5 or through alternate paths or modules.

As another aspect of the embodiments of the present invention, transmit configuration adaptation module 192 is operable to employ a transmit probing technique to determine if any of the physical layer transmission parameters may be changed for improved communications. If a transceiver performs such probing and determines to change the antenna configuration that is used for transmissions to a specified remote transceiver, configuration adaptation module 192 is operable to retransmit message 196 to update lookup table 186.

Figure 6:
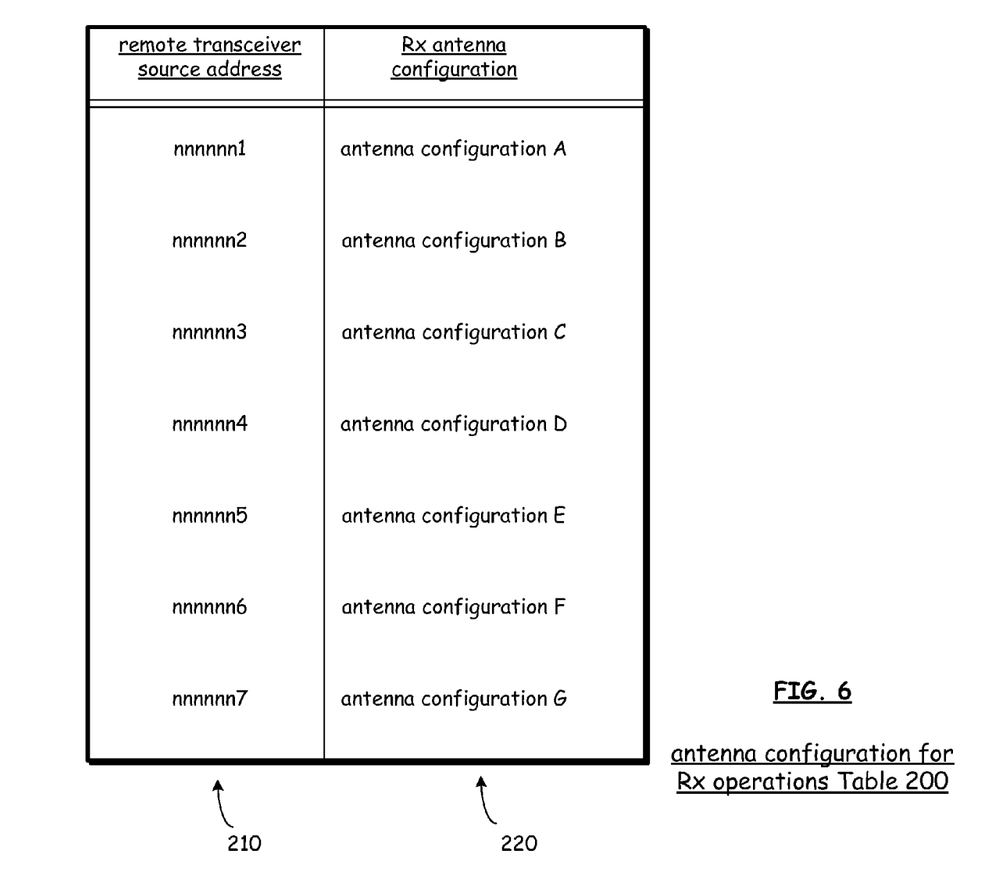
FIG. 6 is a table that illustrates operation for configuring antennas for receive operations according to one embodiment of the invention.

FIG. 6 is a table 200 that illustrates one embodiment for determining antenna configurations for receive operations. As may be seen, the table of FIG. 6 includes two columns 210 and 220 that include entries that correspond or are mapped to each other. More specifically, each row of table 200 includes a remote transceiver source address defined in column 210 and a corresponding receive antenna configuration defined in column 220. Thus, for this embodiment, a transceiver determines a source address based upon a received signal (e.g., an RTS), and uses the source address as an entry to the table to determine the corresponding antenna configuration. In one embodiment, these antenna configurations are determined during transmit operations for transmissions to a specified transceiver as described before and are stored for use during receive operations from the specified transceiver. Channel reciprocity is assumed meaning that it is assumed that the antenna configuration that was optimal for the transmit operations will also be optimal for the receive operations. While the table of FIG. 6 shows antenna configurations A-G, it should be understood that a given antenna configuration may be stored for a plurality of source addresses for communications with a remote transceiver. If an improved antenna configuration is later determined for either transmit or receive operations, the table of FIG. 6 may be updated according to the ID or source address.

Figure 7:
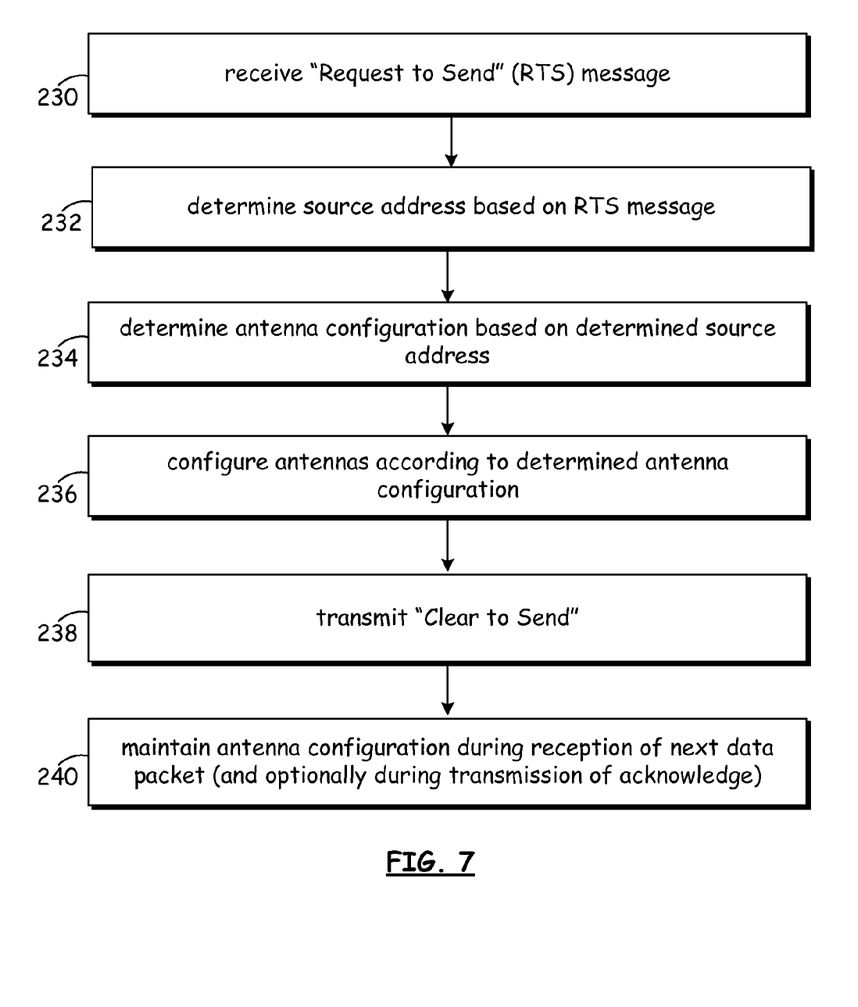
FIG. 7 is a flow chart that illustrates method steps for configuring antennas for receive operations according to one embodiment of the present invention.

FIG. 7 is a flow chart that illustrates a method according to one embodiment of the invention for configuring antennas primarily for receive operations. Initially, the method includes receiving a "Request-to-send" (RTS) message (step 230) from a remote transceiver. The method then includes determining a source address of the remote transceiver based on the RTS message (step 232) and, based on the determined source address, determining a corresponding antenna configuration (step 234). As described above, other types of ID may be used in place of the source address. In one embodiment, a lookup table is utilized wherein the source address is used as an entry to the table to determine the corresponding antenna configuration (for subsequent receive operations for data transmitted by the remote transceiver). This step assumes that the look table had been previously populated with data that maps the source addresses to antenna configurations.

Accordingly, after determining the corresponding antenna configuration based on the remote transceiver source address, the method includes configuring the antennas (switching specified antennas in and out of coupling) in a corresponding manner (step 236). During or after the above steps, the method further includes transmitting a "clear-to-send" (CTS) message to the remote transceiver (step 238). The method further includes maintaining the antenna configuration through reception of at least the next data packet (step 240). Optionally, the antenna configuration is maintained at least through a transmission of an acknowledge signal (ACK) after reception of the data packet.

Figure 8:
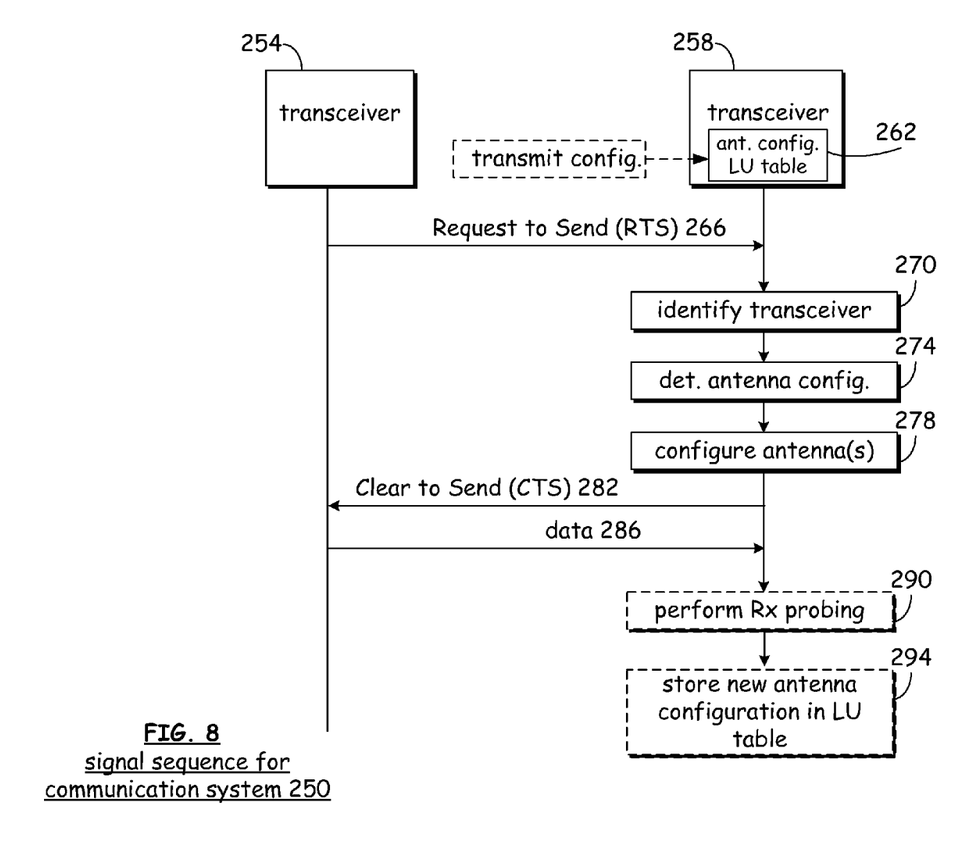
FIG. 8 is a signal sequence diagram for a communication system according to one embodiment of the invention.

FIG. 8 is a signal sequence diagram for a communication system according to one embodiment of the invention. More specifically, a communication system 250 includes a transceiver 254 that is operable to produce or transmit data to a transceiver 258. Transceiver 258 includes an antenna configuration lookup table 262. To initiate the transmission, transceiver 254 initially generates a request-to-send (RTS) message (step 266) to transceiver 258. After receiving the RTS message in step 266, transceiver 258 is operable to identify transceiver 254 (step 270) to determine a corresponding antenna configuration (step 274) and to configure the antennas (step 278) to correspond to an expected transmission scheme (or, more specifically, an antenna configuration or number of streams) for data that will be transmitted by transceiver 254. In one embodiment, table 262 maps transceiver identification information to corresponding antenna configurations. This table 262 is populated with determined transmit antenna configurations for transmissions to the remote transceiver (here, transceiver 254). Thus, based upon an ID or source address of the remote transceiver for pending transmissions that are to be received from the remote transceiver, the corresponding antenna configurations for receive operations from the remote transceiver are the same as the antenna configurations for transmissions to remote transceiver 254.

The identification of remote transceiver 154, which is used as an input to the table, may be any one of a number of different types of identifiers. Thus, for example, table 262 may map source addresses to antenna configurations. During these steps or after these steps, transceiver 258 also generates a clear-to-send (CTS) message (step 282) to advise transceiver 254 that it may take control of the wireless channel to transmit corresponding data. Thereafter, transceiver 254 transmits data (step 286) which transceiver 258 receives and processes using the configured antennas.

As an optional aspect of the embodiment of the invention, transceiver 258 is further operable to perform Rx probing (step 290). Rx probing comprises changing the antenna configuration to determine if a test antenna configuration improves signal reception or quality. Such probing can include, for example, selecting different antennas or utilizing a different number of antennas for the receive operations. Generally, the Rx probing includes temporarily changing the antenna configuration to a test configuration unless the test configuration improves the received signal quality in which case the test configuration becomes a new or changed antenna configuration for communications with the remote transceiver. In an additional optional step, the new antenna configuration is stored in the LU table (e.g., LU table 262 of transceiver 258) to update a stored antenna configuration.

Figure 9:
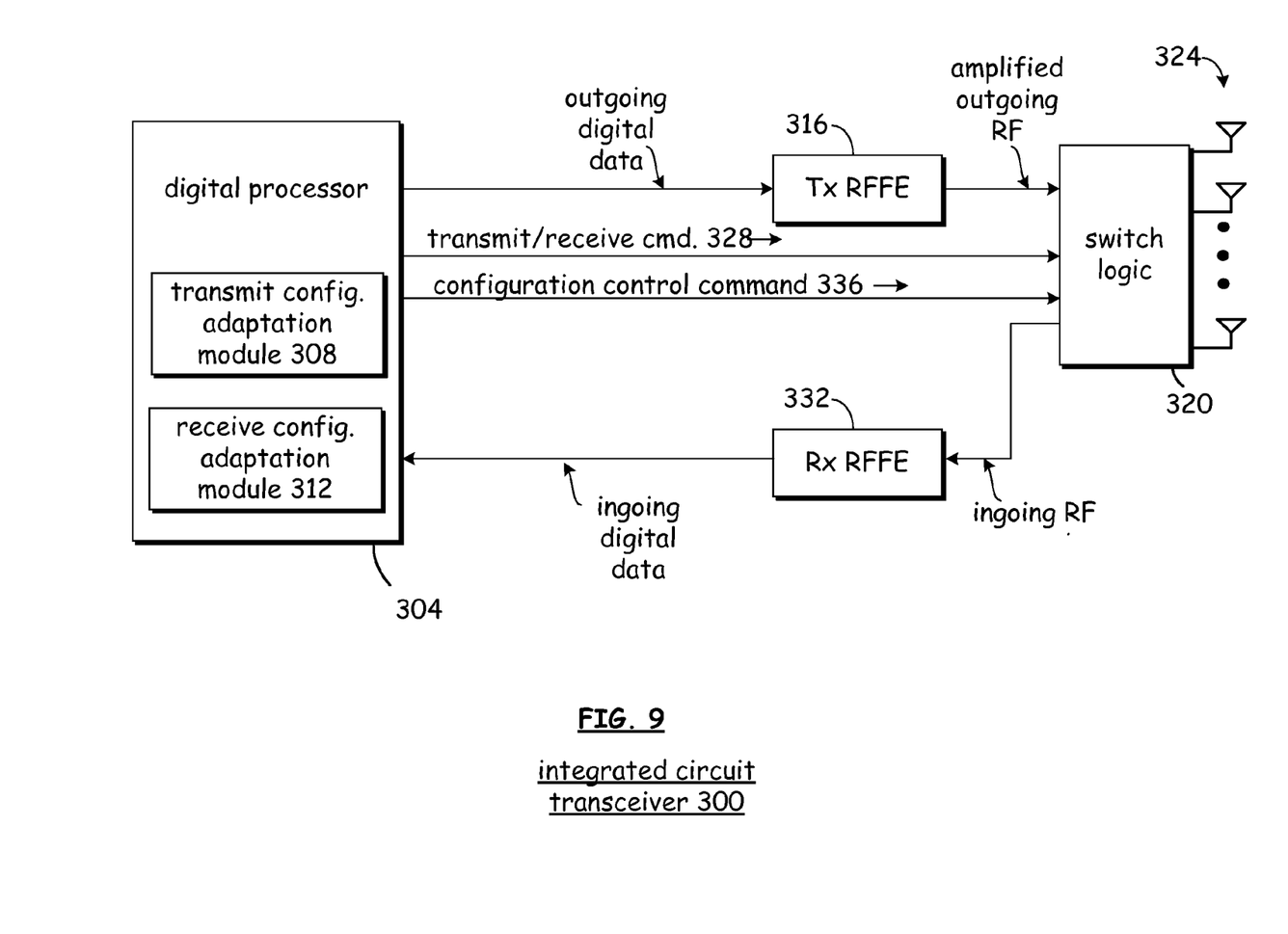
FIG. 9 is a functional block diagram of an integrated circuit transceiver 300 according to one embodiment of the present invention.

FIG. 9 is a functional block diagram of an integrated circuit transceiver 300 according to one embodiment of the present invention. Integrated circuit transceiver 300 includes a digital processor 304 that includes transmit configuration adaptation module 308 and receive configuration adaptation module 312 for storing remote transceiver communication antenna configurations. Module 312 specifically includes, in one embodiment, a lookup table that maps transceiver identification information such as, but not limited to, source addresses to corresponding antenna configurations for receive operations to receive transmissions from the transmitting transceiver.

Here, digital processor 304 is operable to produce outgoing digital data to transmit radio frequency front end circuitry 316 (Tx RFFE 316) which produces an amplified outgoing RF to switching logic 320 that is coupled to a plurality of antennas shown generally at 324. In the described embodiment, digital processor 304 further is operable to transmit a Tx/Rx control command 328 to switching logic 320 to prompt switching logic 320 to couple antennas 324 either to Tx RFFE 316 or Rx RFFE 332. Thus, if switching logic 320 couples antennas 324 to Rx RFFE 332, then transceiver 300 is operating in a receive mode in which ingoing RF received through antennas 324 is produced by switching logic 320 to Rx RFFE 332 which, in turn, produces ingoing digital data to digital processor 304.

One other aspect of the embodiment of FIG. 9 is that digital processor 304 or other logic is operable to produce a configuration control command signal 336 to switching logic 320. Accordingly, switching logic 320 not only couples antennas 324 to RFFE 316 and RFFE 332, but also specifically configures the antennas according to a specified antenna configuration to RFFE 316 and RFFE 332 according to the ID of the remote transceiver with which RF communications are occurring.

For example, for transmission to a specified transceiver, digital processor 304 generates a configuration control command signal 336 that couples a specified selection of antennas to Tx RFFE 316 for a subsequent transmission to the remote transceiver. Similarly, when transceiver 300 is about to receive data from the same remote transceiver, digital processor 304 is operable to generate configuration control command signal 336 to switching logic 320 to couple a similar antenna configuration to Rx RFFE 332 for RF signals that are to be received from the remote transceiver (e.g., the next data packet in an analog RF form). Based on the concept of channel reciprocity, digital processor 304 assumes that the channel conditions remain constant for transmit and receive operations. As such, a determined antenna configuration for transmit operations may be stored in a lookup table according to a remote transceiver identification or address to enable the same configuration to be used for receive operations from the remote transceiver.

Continuing to examine FIG. 9, transmit configuration adaptation module 308 of digital processor 304 is operable to determine a transmission scheme for an outgoing transmission, namely amplified outgoing RF, according to logic that is internal for determining all of the optimal physical layer characteristics for the transmission including an antenna configuration. The antenna configuration of the transmit scheme which is determined by transmit scheme logic 308 is produced in configuration control command 332 and is transmitted to switching logic 320. Receive configuration adaptation module 312 is operable to determine an Rx antenna configuration based upon the antenna configuration used for any communication link with the remote transceiver. Receive configuration adaptation module 312 is further operable to store an antenna configuration for transmissions for to each remote transceiver to which integrated circuit transceiver 300 has transmitted data. Data within logic 312 includes, therefore, the antenna configuration used for the transmissions to the remote transceiver. Accordingly, assuming duality or reciprocity of a physical channel for received data transmissions from the remote transceiver, digital processor 304 is operable to generate configuration control command signal 336 to configure switching logic 320 based on a previous antenna configuration that was used as a part of a transmit scheme for pending receive operations. Thereafter, the digital processor, more particularly, receive configuration adaptation module 312, is operable to configure the antennas through switch 320 to match a last transmission to the remote transceiver.

As an additional aspect, transmit configuration adaptation module is operable to determine to change an antenna configuration for transmit operations and to update the antenna configuration information in the receive configuration adaptation module 312 to correspond to the changed antenna configuration. Additionally, receive configuration adaptation module 312 further includes logic for temporarily changing an antenna configuration for receive operations for transmissions from a remote transceiver and for determining to make the changed configuration a new configuration for future receive operations from the remote transceiver if the changed configuration improves signal quality or reception. Accordingly, module 312 is operable to update its stored antenna configuration to correspond with the changed configuration.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries may be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level.

As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The invention claimed is:

1. A method in a wireless transceiver, comprising:
   receiving a request-to-send message transmitted by a remote transceiver; and
   configuring a plurality of antennas for receiving a data packet transmitted over one or more wireless transmission streams from the remote transceiver by:
   determining an identity of the remote transceiver;
   based upon the identity of the remote transceiver, determining a corresponding receive antenna configuration; and
   operably coupling the plurality of antennas to receive path circuitry to correspond with the determined corresponding receive antenna configuration to receive a data packet transmitted over a plurality of streams from a plurality of antennas.

2. The method of claim 1 further including maintaining the determined receive antenna configuration as long as a subsequent data packet transmitted by the remote transceiver is being received.

3. The method of claim 2 further including maintaining the determined receive antenna configuration until an acknowledge signal is transmitted to the remote transceiver after receiving the subsequent data packet.

4. The method of claim 1 further including determining and storing a transmit antenna configuration for use as the determined corresponding receive antenna configuration in relation to the remote transceiver identity.

5. The method of claim 4 further including updating the determined corresponding receive antenna configuration with a changed antenna configuration that improves signal quality.

6. The method of claim 5 wherein the changed antenna configuration corresponds to a new antenna configuration for transmissions to the remote transceiver.

7. The method of claim 5 wherein the wireless transceiver is operable to use a test antenna configuration to determine that the test antenna configuration is preferred for receiving transmissions from the remote transceiver to determine that the changed antenna configuration improves signal quality.

8. The method of claim 1 wherein the remote transceiver identity is a source address of the remote transceiver.

9. A wireless transceiver for receiving and processing data packets, comprising:
   receive path circuitry operable to receive a request-to-send (RTS) message transmitted by a remote transceiver;
   transmit path circuitry operable to transmit a clear-to-send (CTS) message;
   switching logic for selectively switching antennas in and out of coupling with the receive path and transmit path circuitry; and
   wherein the wireless transceiver is operable to:
      store antenna configurations for wireless communications with remote transceivers in a table that maps antenna configurations in relation to remote transceiver IDs;
      determine a remote transceiver ID that corresponds to the RTS message received from the remote transceiver;
      determine, using the remote transceiver ID as an input to the table, an antenna configuration that corresponds to the remote transceiver ID;
      operably couple the antennas to the receive path circuitry to correspond with the determined antenna configuration; and
      receive at least one data packet using the determined antenna configuration transmitted over a plurality of streams from a plurality of antennas.

10. The wireless transceiver of claim 9 wherein the transceiver is further operable to transmit an acknowledge message using the determined antenna configuration.

11. The wireless transceiver of claim 9 further including a receive configuration adaptation module and a transmit configuration adaptation module wherein the transmit configuration adaptation module produces the antenna configurations in relation to the remote transceiver IDs to the receive configuration adaptation module to store and use for receive operations.

12. The wireless transceiver of claim 9 wherein the wireless transceiver is operable to:
   determine the antenna configurations for transmit operations;
   store the antenna configurations for receive operations; and
   update the antenna configurations for receive operations by determining at least one of:
      a better antenna configuration exists for transmit operations to at least one remote transceiver; or
      a better antenna configuration exists for receive operations from at least one remote transceiver.

13. A method in a wireless transceiver for receiving and processing data packets, comprising:
   receiving a request-to-send message from a remote transceiver wanting to transmit at least one data packet to the wireless transceiver;
   identifying the remote transceiver based upon the request-to-send message;
   determining an antenna configuration based upon an identification of the remote transceiver;
   switching at least one antenna of a plurality of antennas in and/or out of coupling to correspond with the determined antenna configuration;
   transmitting a clear-to-send message to the remote transceiver; and
   receiving at least one data packet transmitted over a plurality of streams from a plurality of antennas from the remote transceiver that generated the request-to-send message using the determined antenna configuration.

14. The method of claim 13 further including determining a source address of the remote transceiver that transmitted the request-to-send message.

15. The method of claim 13 further including storing a transmit antenna configuration in relation to the identification of the remote transceiver for use as a receive antenna configuration.

16. The method of claim 13 wherein the determined antenna configuration for receive operation corresponds to a plurality of streams utilized in communications with the remote transceiver.

17. The method of claim 13 further comprising modifying the determined antenna configuration for receive operations to determine if a modified antenna configuration improves a signal quality for data packets received from the remote transceiver.

18. The method of claim 17 further comprising updating a stored antenna configuration to correspond with the modified antenna configuration.

19. The method of claim 17 further comprising updating a stored antenna configuration to correspond with a new antenna configuration for transmit operations to the remote transceiver.

20. A wireless transceiver for receiving and processing data packets, comprising:
   receive path circuitry operable to receive a request-to-send message transmitted by a remote transceiver;
   transmit path circuitry operable to transmit a clear-to-send message;
   determining an ID of the remote transceiver;
   logic for determining an antenna configuration that corresponds to the ID of the remote transceiver;
   logic for switching antennas in and/or out of coupling based upon the determined antenna configuration; and
   wherein the wireless transceiver is operable to receive data packets transmitted over a plurality of streams from a plurality of antennas from the remote transceiver that generated the request-to-send message utilizing the determined antenna configuration.

21. The wireless transceiver of claim 20 wherein the antenna configuration is selected to correspond to a number of streams transmitted by the remote transceiver.

22. The wireless transceiver of claim 20 wherein the wireless transceiver is operable to modify the determined antenna configuration to determine if a modified antenna configuration improves a signal quality for one or more data packets.

23. The wireless transceiver of claim 22 wherein the wireless transceiver is operable to keep a number of antennas in the determined antenna configuration constant but to modify the selected antennas to determine if received signal quality can be improved.

24. A wireless transceiver, comprising:
   transmit path circuitry;
   receive path circuitry; and
   logic to determine and set an antenna configuration for receive operations for packets transmitted over a plurality of streams from a plurality of antennas based upon at least one of:
      an antenna configuration to be used for transmissions to the remote transceiver as specified by a defined transmit scheme;
      an antenna configuration last used for transmissions to the remote transceiver; and
      an antenna configuration last used for transmissions received from the remote transceiver.

* * * * *